United States Patent Office 3,155,739
Patented Nov. 3, 1964

3,155,739
SELECTIVE HYDROGENATION OF ACETYLENE
Harold W. Fleming, Louisville, Ky., assignor to Catalysts and Chemicals Inc., Louisville, Ky., a corporation of Delaware
No Drawing. Filed July 17, 1959, Ser. No. 827,690
1 Claim. (Cl. 260—677)

This invention concerns an improved process for purifying olefins which are contaminated with highly unsaturated compounds. More specifically, this invention is concerned with the conversion of acetylenic and diolefinic compounds in gas mixtures whereby a high degree of selectivity is achieved by reason of the catalyst utilized.

One of the usual methods for manufacturing olefins comprises passing mixtures such as refinery gas, kerosene or gas oil through a reactor heated sufficiently to decompose such materials with the formation of hydrogen and one or more unsaturated compounds. Pyrolyses of this type have been carried out at temperatures ranging from about 500° C. to about 1200° C. with the yield of olefinic products per pass-through the reactor being highest at temperatures above 600° C. The olefin-containing mixtures obtained in such processes usually contain a variety of hydrocarbons with the olefins and separation of the latter in a form suitable for use such as in the production of high polymeric plastics has proven difficult. For instance, cracked butanes, cracked oil gas or refinery gas, all of which are well known sources of olefins usually contain paraffinic hydrocarbons ranging from methane to hexane, olefins such as ethylene, propylene, butylene, amylene and hexenes, diolefins such as propadiene, 1,3 butadiene, 1,2 butadiene, isoprene, piperylene and a small but appreciable amount of acetylenic hydrocarbons such as acetylene, methyl acetylene, ethyl acetylene and vinyl acetylene. The yield of acetylenic by-products becomes appreciable when operating at pyrolysis temperatures above 600° C., i.e. within the temperature range at which the olefins are usually produced in maximum yield.

In instances where propylene is the desired constituent, the propylene content may be purified to a concentration as high as 90% while in other instances propylene may be present in a concentration as low as 3–4%. In almost all instances the gas streams contain ethylene and there is a choice as to whether $C_2$'s and $C_3$'s are separated prior to treatment. A table of representative gas streams may be found in the publication of Gutmann, W. R., Fleming, H. W., and Cromeans, J. S., entitled "Purification of Propylene for Polypropylene Production," delivered at the Kansas City A.I.Ch.E. meeting on May 19, 1959.

In instances where the $C_2$ olefins are separated from the $C_3$ olefins, prior to purification the sulfur content of the $C_2$ olefins is reduced to a concentration in the range of 2–10 p.p.m. As is pointed out by Gutmann et al., loc. cit., there is a tendency for carbonyl sulfide to concentrate with the $C_3$ olefins due to the close boiling points of carbonyl sulfide and propylene. Thus, different problems are encountered if the gas streams are separated into $C_2$ and $C_3$ fractions prior to treatment than are encountered if the gas streams are treated in the "raw" state. Furthermore, different problems are encountered in treating the $C_2$ fraction than are encountered in treating the $C_3$ fraction due to the propensity of carbonyl sulfide to concentrate in the propylene fraction.

An object of this invention is to provide a catalyst which is active and selective over a wide range of conditions. Another object of this invention is to provide a process whereby raw gas streams containing $C_2$ and $C_3$ olefins may be purified from highly unsaturated hydrocarbons with essentially no loss of the valuable $C_2$ and $C_3$ olefins. Aside from the acetylenes, the highly unsaturated hydrocarbon impurities are for the most alpha beta unsaturated aliphatic hydrocarbons having no hydrogen atom on the beta carbon atom. That is to say, they are alpha beta diolefins or 1–2 diolefins. For convenience, such impurities are referred to herein as highly unsaturated hydrocarbon impurities. Still another object of this invention is to provide a process and a catalyst for use therein whereby gas mixtures containing $C_3$ and $C_4$ highly unsaturated impurities may be converted to monoolefins and if ethylene is present with little or no loss thereof. Still another object of this invention is to provide a process and or catalyst for use therein wherein acetylene in an ethylene stream may be hydrogenated to a low level of concentration with concomitant increase in the ethylene content.

An ideally selective catalyst is one in which the highly unsaturated hydrocarbons are hydrogenated to monoolefins rather than to paraffins. In other words, in a gas stream containing 1–2% methyl acetylene, vinyl acetylene or propadiene, a truly selective catalyst will convert these impurities to propylene with essentially no hydrogenation of the propylene or ethylene in the gas composition. It has previously been thought that nickel sulfide was unique in selectively hydrogenating alkyl acetylenes and alpha beta diolefins to olefins. I have found, however, that a catalyst comprising cobalt sulfide is significantly more selective over a wider range of conditions than is nickel sulfide. Therefore, according to this invention a gas mixture containing predominantly $C_2$ olefins and trace amounts of sulfur may be treated with the catalyst of this invention to produce a purified gas containing acetylene in a concentration of less than 10 p.p.m. By the expedient of increasing the sulfur concentration to about 20 p.p.m., there is achieved an increase in ethylene concentration with a high degree of purification. I have found further in gas streams containing both $C_2$ and $C_3$ olefins that an increase in the $C_3$ olefins can be achieved with little or no loss of the $C_2$ olefins.

Cobalt sulfide catalysts for use in the invention may be prepared in a variety of different ways and the particular form which is most advantageous in any given case will depend, among other things, on the particular process in which the catalyst is to be utilized. Generally, however, for optimum efficiency and economy a supported catalyst is preferred and because of the inevitable deposition of polymeric or other carbonaceous materials on its surface under process conditions, a rugged, attrition-resistant support is desired, due to the drastic regeneration treatment to which the catalyst must be periodically subjected. The method of incorporating the cobalt sulfide onto the support may vary. The easiest and most economical method is that of impregnation with a solution cobalt sulfate followed by reduction with hydrogen to produce cobalt subsulfide. Another method of preparing the catalyst may involve impregnation of the support with a salt of cobalt decomposable to the oxide upon calcination and thereafter treating of the cobalt oxide catalyst with preheated hydrogen sulfide at a temperature of from 300 to 400° C. until the surface is substantially all cobalt sulfide. Usually about four hours of heating with hydrogen sulfide is sufficient. Another method of preparing the catalyst may involve precipitation of cobalt sulfide onto the surface and pores of the carrier substance. In some instances, it may not be necessary to utilize a support at all; however, the support normally provides desirable physical stability to the finished catalyst and because of the significant reduction in concentration of the expensive catalytic constituent the support is quite desirable economically. Suitable supports are of usually a relatively inert carrier and may include broken brickware, china clay pellets, refractories, majolica, pumice, etc.

The selective hydrogenation of the highly unsaturated impurities may be carried out under various conditions of temperature and pressure, the choice of which is dependent to some extent on the nature of the material to be treated. Thus in some instances the $C_3$ and $C_4$ materials have been previously separated by pressure distillation and the gas stream containing $C_2$ olefins is under a pressure of from about 200 to 500 p.s.i.g. Such gas was passed through the reactor at a pressure maintained in the range of 210 to 500 p.s.i.g., a temperature maintained in the range of from 350 to 500° F., and at a space velocity in the range of from 1000 to 4000. Space velocity is defined as the volumes of gas passed over an equal volume of catalyst per hour under conditions of normal temperature and pressure. The data collected from these tests are tabulated below:

*Table I*

| Hrs. | Temp. | Space Velocity | Pressure, p.s.i.g. | Concentration of COS, p.p.m. | Ethylene Hydrogenated | $C_2H_2$ out, p.p.m. | Remarks |
|---|---|---|---|---|---|---|---|
| 8 | 450 | 1,000 | 210 | 5 | 3.08 | 0 | |
|   | 450 | 2,000 | 210 | 5 | 1.5 | 0 | |
|   | 450 | 2,900 | 210 | 5 | 0.3 | 0 | 0.5 gain in ethylene.* |
|   | 450 | 4,000 | 210 | 5 | 0.0 | 13 | |
|   | 400 | 2,000 | 210 | 5 | 1.0 | 2 | |
| 24 | 400 | 3,000 | 210 | 5 | 0.5 | 13 | 0.25 gain in ethylene. |
|   | 400 | 4,000 | 210 | 5 | 0.0 | 43 | |
|   | 400 | 2,000 | 500 | 5 | 7.2 | 0 | 0.5 gain in ethylene. |
|   | 450 | 2,000 | 210 | 20 | 0.0 | 13 | |
| 88 | 500 | 2,000 | 210 | 20 | 0.0 | 3 | 0.53 gain in ethylene. |
|   | 500 | 4,000 | 210 | 20 | 0.0 | 95 | |
|   | 400 | 2,000 | 500 | 20 | 1.8 | 2 | 0.25 gain in ethylene. |
| 112 | 350 | 2,000 | 500 | 20 | 0.0 | 44 | |
|   | 400 | 3,000 | 500 | 5 | 0.3 | 21 | |
| 136 | 400 | 2,000 | 500 | 5 | 0.8 | 0 | |
|   | 350 | 2,000 | 500 | 5 | 0.3 | 19 | |

*Measurements made by chromatograph; values reported are within experimental error of ±0.2%.

streams are usually substantially free of sulfur compounds. In other instances the gas streams have been partially purified but contain considerable amounts of $C_3$ and $C_4$ olefins and a significant amount of carbonyl sulfide. In still other cases the gas may be "raw" in which case the distribution of olefinic constituents and the concentration of sulfur compounds will be dependent upon the feed from which the gas stream was obtained and the conditions of pyrolysis to which the feed was subjected. Generally speaking, the catalyst of this invention is selective in any of the above streams at pressures in the range of from 1 to 60 atmospheres and temperatures in the range of from about 300 to 600° F.

The invention will be better understood by reference to the following examples:

EXAMPLE 1

A batch of catalyst was prepared by immersion of commercial Norton Alundum Spheres (LA 728) into a solution of a cobalt salt. The Norton Alundum spheres had a diameter of 5/16 inch and a surface area in the range of from 0–1 m.²/gram. The impregnating solution was prepared by dissolving cobalt metal in an aqueous nitric acid solution, and thereafter adding an equivalent quantity (based on the metal) of sulfuric acid. The spheres were then removed and after drying were calcined at 800° F. for 12 hours. The metal concentration on the carrier amounted to cobalt 1.9% by weight (expressed as metal). The cobalt was present as a mixture of sulfate and oxide, the sulfur concentration analyzing at 1.2%. Twenty-five cc. of catalyst were loaded into a reactor which consisted of an iron pipe with catalyst support grids and which was jacketed with a Dowtherm jacket equipped with a reflux condenser to insure an isothermal temperature. The catalysts were then reduced with hydrogen at a temperature in the range of 750–900° F. for eight hours to convert the cobalt sulfate to cobalt subsulfide and any cobalt oxide to cobalt metal.

A gas mixture of the following composition:

Ethylene, $C_2H_4$ ---------- 42.0%
Hydrogen, $H_2$ ---------- 18.3%
Methane, $CH_4$ ---------- 39.4%
Acetylene, $C_2H_2$ ---------- 0.3% (3000 parts per million)
Carbonyl sulfide, COS --- 5 parts per million It will be noted that this catalyst was active and selective for hydrogenation of acetylene over a wide range of temperature and pressure. With as little as 5 parts per million of carbonyl sulfide in the gas stream only a slight loss of ethylene was encountered and this loss could be reduced by increasing the space velocity or lowering the temperature. When the carbonyl sulfide concentration was increased to 20 parts per million, there was an increase in olefin production even when the pressure was increased to 500.

EXAMPLE 2

A batch of catalyst was prepared by immersing 5/16 inch diameter Norton Alundum spheres (LA 728) in an aqueous impregnating solution. The impregnating solution was prepared by dissolving metallic nickel and metallic cobalt in an aqueous nitric acid solution to which chromic acid anhydride had been added. A molecular equivalent (based on the metal content) of sulfuric acid was added and the Alundum spheres were immersed, drained, dried and calcined at a temperature of about 800° F. for about 12 hours. The catalyst contained 2.9 nickel, 0.53% cobalt and 0.07 chromium (all expressed as metals) and the sulfur analyzed at about 1.6%. Twenty-five cc. of catalyst were loaded into an isothermal reactor and reduced with hydrogen at a temperature in the range of 750–900° F. as in Example 1.

The catalyst was then tested with the same gas composition and under the same conditions as those of Example 1. The data collected from this run are tabulated in Table 2.

*Table 2*

| Hours on Stream | Temperature | Space Velocity | Pressure p.s.i.g. | Ethylene Hydrogenated, Percent | Acetylene out, p.p.m. | Remarks |
|---|---|---|---|---|---|---|
| 8 | 350 | 2,000 | 210 | 3.4 | 0 | |
| 32 | 350 | 3,000 | 210 | 7.2 | 0 | |
| 48 | 300 | 3,000 | 210 | 9.9 | 3 | |

It will be noted that this catalyst, although active for the hydrogenation of acetylene became less and less selective with the passage of time with concomitant loss of the valuable ethylene. This lack of selectivity could not be modified by an increase in space velocity or a decrease in temperature.

EXAMPLE 3

An impregnating solution was prepared by adding 313.5 grams of cobalt nitrate ($Co(NO_3)_2 \cdot 6H_2O$), 2.5 grams of chromic acid anhydride ($CrO_3$) and 100.0 grams of sulfuric acid ($H_2SO_4$) to 334 grams of water. 100 grams of Norton Alundum spheres (LA 623) having a surface area of 5-6 m.²/gram were immersed in this solution, removed, dried and calcined at 800° F. for 12 hours. The catalyst contained 3.7% cobalt and .05% chromium (both expressed as metals).

Twenty-five cc. of catalyst were loaded into an isothermal reactor which consisted of an iron pipe with catalyst support grids and which was jacketed with a Dowtherm jacket equipped with a reflux condenser. The catalysts were then reduced with hydrogen at a temperature in the range of 750–900° F. for eight hours to convert the cobalt sulfate to cobalt subsulfide and any cobalt oxide to cobalt metal.

A gas mixture of the following composition:

| | |
|---|---|
| Propylene, $C_3H_6$ | 17.7 |
| Ethylene, $C_2H_4$ | 63.5 |
| Hydrogen, $H_2$ | 14.3 |
| Methane, $CH_4$ | 2.0 |
| Water vapor, $H_2O$ | 0.1 |
| Carbonyl sulfide, COS p.p.m. | 150–160 |
| Methyl acetylene, $C_3H_4$ | 2.3 | was passed through the reactor at a pressure maintained at 240 p.s.i.g., a temperature of 500° F. and a space velocity of 800. Under these conditions the methyl acetylene was reduced to a range of from 18 to 35 parts per million with less than 1.0% loss of ethylene and a gain in propylene of over 2%.

EXAMPLE 4

A catalyst containing on a final basis 3.3% cobalt and 0.07 chromium (both expressed as metals) was prepared by the method of Example 3. After reduction at 750 for three hours, whereby the cobalt sulfate was converted to cobalt subsulfide, the following gas was passed over the catalyst under the identical conditions of Example 3:

| | |
|---|---|
| Propylene, $C_3H_6$ | 17.0 |
| Ethylene, $C_2H_4$ | 65.8 |
| Hydrogen, $H_2$ | 11.5 |
| Methane, $CH_4$ | 4.0 |
| Water vapor, $H_2O$ | 0.1 |
| Methyl acetylene, $C_3H_4$ | 2.5 |
| Carbonyl sulfide, COS | 0.1 (1322 p.p.m.) |

Analysis of the effluent indicated negligible conversion of COS and olefins. The methylacetylene concentration in the outlet was found to be 35 p.p.m. which amounts to over a 99.8% conversion.

EXAMPLE 5

The catalyst of Example 3 (cobalt 3.7, chromium .05, expressed as metals) was tested under the identical conditions of Example 3 except that the following gas mixture was utilized:

| | |
|---|---|
| Ethylene, $C_2H_4$ | 78.0 |
| Hydrogen, $H_2$ | 14.3 |
| Methane, $CH_4$ | 1.2 |
| Methyl acetylene, $C_3H_4$ | 2.5 |
| Water vapor, $H_2O$ | 0.1 |
| Carbonyl sulfide, COS p.p.m. | 158 |

During the first day of operation the ethylene loss was under 1% (0.7%) and the methyl acetylene was reduced to 22 p.p.m. After five days of operation there was no loss of ethylene and the methyl acetylene was reduced to 18 p.p.m.

EXAMPLE 6

A batch of catalyst prepared in the manner of Example 2 (containing 2.9% nickel, 0.53% cobalt and 0.07 chromium oxide, all expressed as metals on Norton Alundum spheres) was charged to an isothermal reactor and reduced with hydrogen at 750° F. to convert the metal sulfates to the subsulfide. The following gas composition saturated with 5% water vapor was passed over the catalyst:

| | |
|---|---|
| Ethylene, $C_2H_4$ | 89.5 |
| Hydrogen, $H_2$ | 8.0 |
| Methyl acetylene, $C_3H_4$ | 2.5 |
| Carbonyl sulfide, COS p.p.m. | 143 |

The data collected from this run are tabulated below:

*Table 3*

| Hours on Stream | Temp., ° F. | Pressure, p.s.i.g. | Space Velocity | Ethylene Hydrogenated | Methyl Acetylene out, p.p.m. |
|---|---|---|---|---|---|
| 6 | 450 | 240 | 800 | 3.4 | 180 |
| 12 | 485 | 240 | 800 | 3.4 | 156 |

It will be noted in comparing the efficiency of this catalyst with the efficiency of the catalyst of Example 5, that the catalyst of this example hydrogenated more ethylene and less methyl acetylene than did the catalyst of Example 5. In other words, the catalyst was less selective toward the valuable ethylene and less active toward the undersirable methyl acetylene.

In the process of this invention, the ratio of hydrogen to the unsaturated impurities may vary within wide limits because, as is shown by the examples, the catalysts comprising cobalt sulfide promote the selective hydrogenation of said impurities to the substantial exclusion of the conversion of the monoolefins. For this reason, it is unnecessary and undesirable to limit the hydrogen concentration in the gas stream and selectivity is not materially affected by the hydrogen partial pressure. Normally from five to fifteen times the stoichiometric requirement of hydrogen is utilized; however, more hydrogen may be utilized if desired.

While the examples have been restricted for the sake of clarity and conciseness to the selective hydrogenation of acetylenes and other highly unsaturated compounds contained in monoolefinic gas streams, it will be apparent to those skilled in the art that the catalysts may be utilized for the selective hydrogenation of a number of other fluid compositions, as for example the selective hydrogenation of vinyl acetylene or alpha beta diolefins in the presence of conjugated diolefins (butadiene) and hydrogenation of butadiene in a butylene stream.

I claim as my invention:

The process of selectively hydrogenating an acetylene in a gas stream containing ethylene as a major constituent and as a minor impurity sulfur in the range of from about 1 to about 20 p.p.m. which consists of the steps of passing said gas stream with hydrogen over a catalyst containing from about 1 to about 10% by weight of cobalt sulfide as the effective selective hydrogenating catalyst on an inert support at a temperature in the range of from about 250° F. to about 600° F. and a pressure in the range of about 30 to about 60 atmospheres, said hydrogenation being carried out with an excess of hydrogen which is about 5 times that required to hydrogenate acetylene in said stream.

References Cited in the file of this patent

UNITED STATES PATENTS

| | | |
|---|---|---|
| 2,402,684 | Signaigo | June 25, 1946 |
| 2,497,176 | Mason | Feb. 14, 1950 |
| 2,511,453 | Barry | June 13, 1950 |
| 2,735,879 | Redcay | Feb. 21, 1956 |
| 2,736,689 | Stuart | Feb. 28, 1956 |
| 2,753,310 | Riedl | July 3, 1956 |
| 2,959,627 | Fleming et al. | Nov. 8, 1960 |
| 3,003,008 | Fleming et al. | Oct. 3, 1961 |